Figure 1:
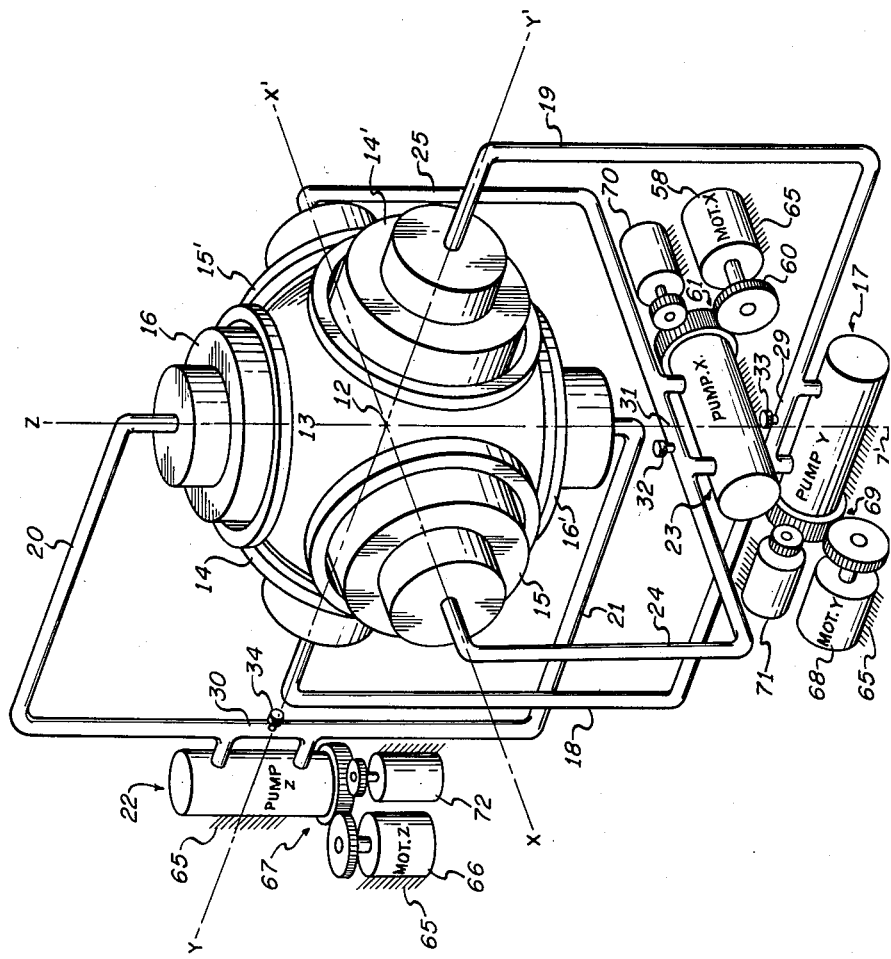

Jan. 14, 1964 W. G. WING 3,117,456
ACCELEROMETERS
Filed Dec. 12, 1960 3 Sheets-Sheet 1

INVENTOR
WILLIS G. WING
BY
ATTORNEY

INVENTOR
WILLIS G. WING

Jan. 14, 1964  W. G. WING  3,117,456
ACCELEROMETERS
Filed Dec. 12, 1960  3 Sheets-Sheet 3

INVENTOR.
WILLIS G. WING
BY
ATTORNEY

United States Patent Office 3,117,456
Patented Jan. 14, 1964

3,117,456
ACCELEROMETERS
Willis G. Wing, Glen Head, N.Y., assignor to Sperry Rand Corporation, Great Neck, N.Y., a corporation of Delaware
Filed Dec. 12, 1960, Ser. No. 75,212
16 Claims. (Cl. 73—503)

This invention relates to accelerometers of the hydraulic type in which the apparatus provided includes a fluid located mass of the non-rotating type that responds to the influence of acceleration thereon along three orthogonally arranged axes. In navigating systems where one of the axes is located vertically and two of the axes are located horizontally and mutually perpendicular on a directed craft, the mass senses acceleration along the three axes. The apparatus functions to provide integrated measures of the respective accelerations. The primary object of the present invention is accordingly to provide an hydraulic apparatus of the character described that measures acceleration along three orthogonally arranged axes.

In the improved apparatus, the acceleration sensing mass is located in a fluid chamber by a viscous dielectric fluid that fills the chamber and is of a density different from that of the mass. The mass is maintained in a position in the chamber such that its geometrical center is normally located at the intersection of the provided orthogonal axes by means of the circulation of fluid with relation to the chamber by an hydraulic pump included in the apparatus for each of the axes. The rate at which a pump operates to circulate fluid to maintain the mass centered along a given axis of the apparatus is proportional to the acceleration along the axis. Where the pumps are rotary in character, the angular displacement of a given pump shaft over a considered time interval accordingly provides a measure of integrated acceleration, or change in velocity of the apparatus, during the time interval considered for the chosen axis.

The density of the fluid, the size and weight of the mass, and the gap width between the mass and the pairs of hydraulic centering pads included in the chamber are chosen to provide a high degree of damping in the apparatus. Such damping is provided to assure the stable operation of the apparatus under conditions including the extreme vibrations found in navigating systems used to control the flight of missiles or rockets. Other parameters are chosen so that the circulation of the fluid in the chamber is below the critical Reynold's Number for turbulence even at the highest output of the apparatus.

One of the features of the invention is in the provision of an hydraulic apparatus of the type described that includes a casing with a fluid filled chamber having three opposed pairs of hydraulic pads located in orthogonal relation therein to provide the axes of the apparatus.

In accordance with a further feature of the invention, the configuration of the mass located in the chamber is such that its geometrical center is normally located at the intersection of the axes of the accelerometer.

A further feature of the invention resides in the inclusion in the surfaces of the pairs of the provided hydraulic pads of circular channels arranged in concentric relation to the axes and bleed ports for the fluid connecting each of the channels to the fluid filled chamber in by-passing relation to the gaps. By this arrangement, a greater variation is tolerated in the gap width characteristic of the apparatus without adversely affecting its scale factor.

Another feature of the invention is provided by an arrangement of the three closed pump housings, the casing providing the fluid filled chamber and the conduits connecting the housings and casing as an assembly of fluid circulating components. This facilitates the maintenance of the fluid circulating in the hydraulic apparatus within a desired temperature range.

Figure 2:
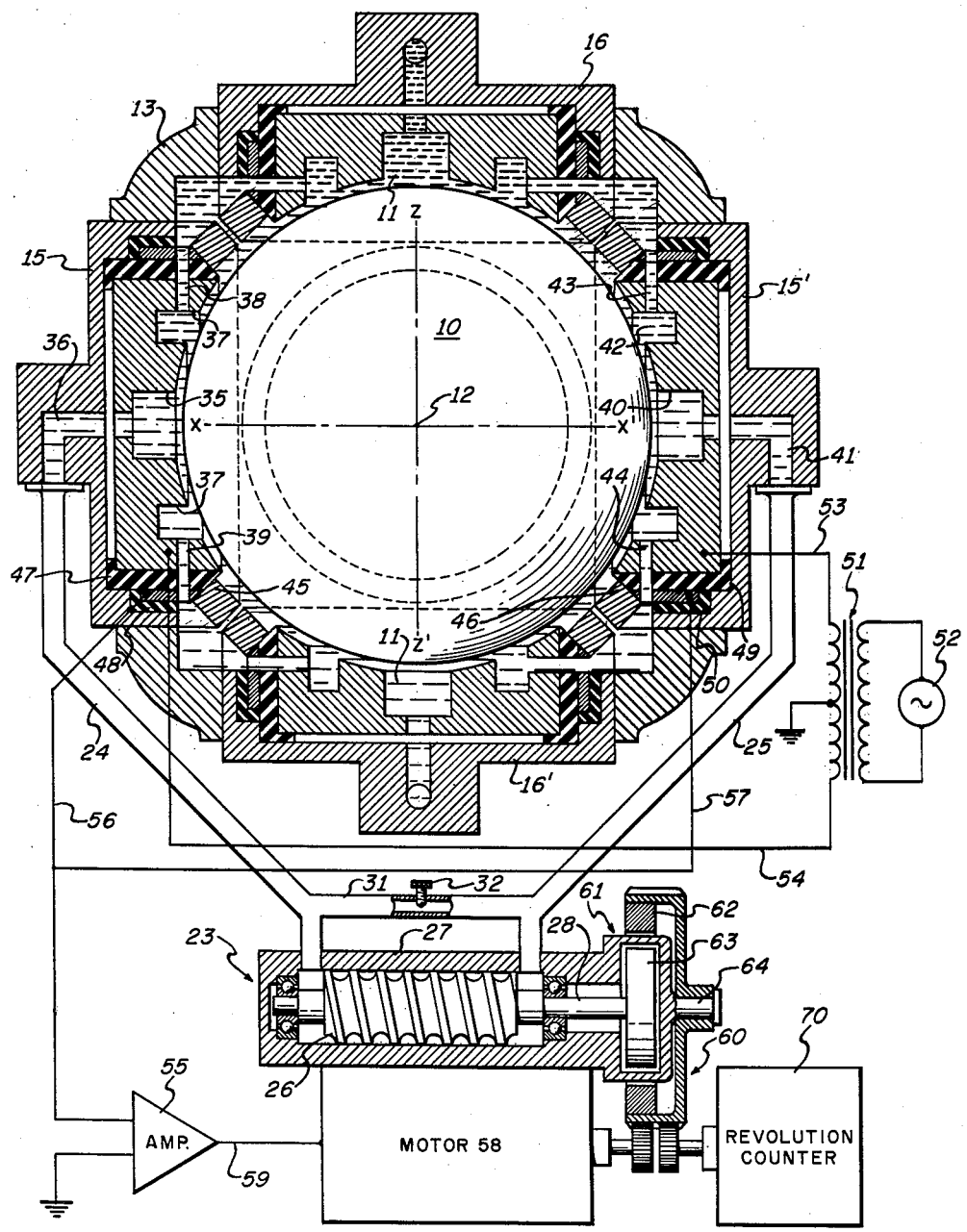
Figure 3:
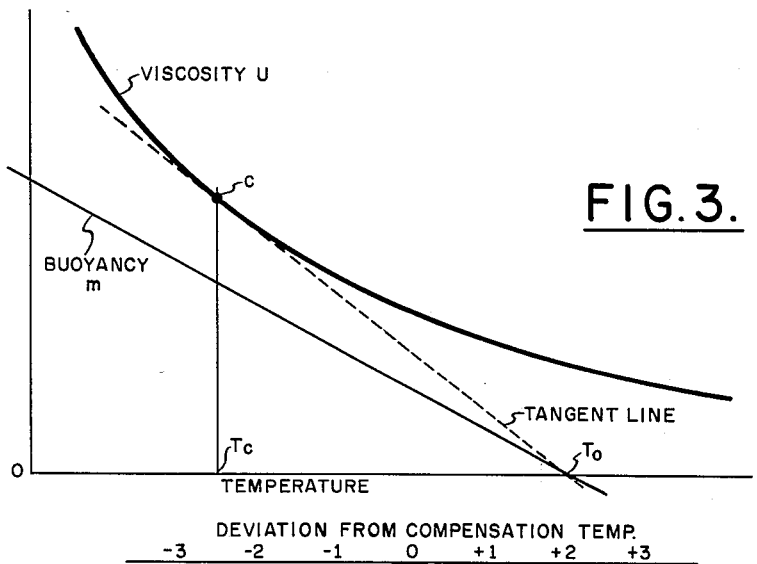
Figure 4:
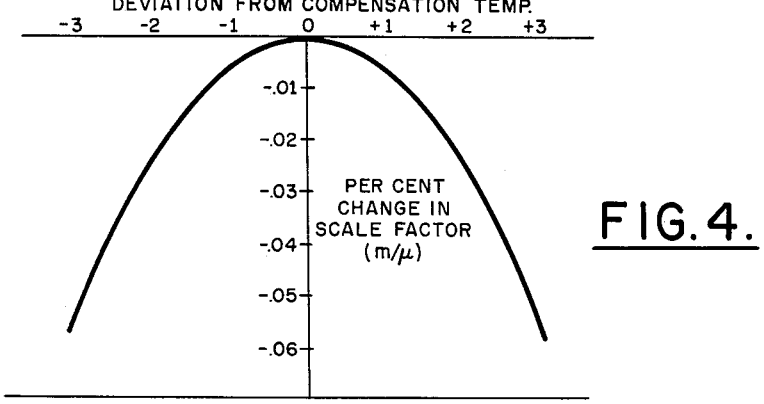
Figure 5:
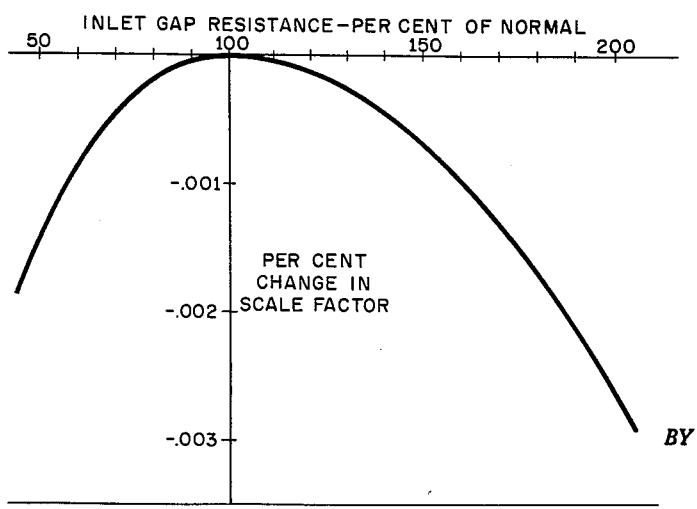

Other objects, features and structural details of the present invention will appear from the following description of the embodiment herein illustrated in the accompanying drawings in which:

FIG. 1 is a schematic perspective view showing a three axis assembly of the improved hydraulic apparatus, FIG. 2 is a further schematic view of the improved apparatus for a single control axis where the hydraulic casing and one of the pumps are shown in vertical section, and FIGS. 3, 4 and 5 are graphs that are descriptive of the compensations provided the apparatus where the mass is of less density than the fluid and is accordingly buoyantly supported.

As represented in FIG. 2, the improved three axis accelerometer shown includes an acceleration sensing mass 10. The configuration of the mass 10 of the apparatus is preferably that of a ball or sphere whose center of gravity is made to coincide with its geometrical center as closely as possible so that the mass exhibits minimum pendulosity. The spherical mass 10 may for example be constructed of an electrically conductive metal in the form of a hollow aluminum shell or a solid beryllium ball.

The sensing mass 10 of the apparatus is located hydraulically by a viscous circulating fluid indicated at 11 in FIG. 2 that is preferably dielectric in character. The relative densities of the supported mass or sphere 10 and the circulating fluid 11 of the apparatus are required to be different. For the shell type mass described, the fluid utilized in the apparatus may be a silicone oil of a density greater than that of the density of the shell. Where the mass is a beryllium ball, the different density fluid may be provided by a liquid polybromotrifluoroethylene liquid compound. The positive or negative buoyancy provided by the circulating fluid in the improved apparatus for the mass is directly dependent on the degree of difference between the relative densities of the components with regard to one another.

The three axes of the improved accelerometer are orthogonally arranged. As shown in FIG. 1, axes X—X' and Y—Y' are represented as mutually perpendicular, normally horizontal axes and axis Z—Z is a normally vertical axis. In the improved apparatus, the substantially balanced mass 10 is supported by the centering fluid 11 so that its geometrical center is normally located at the point of intersection of the axes X—X', Y—Y' and Z—Z' as indicated at 12 in FIGS. 1 and 2. The orthogonal axes of the apparatus are provided by the accurate alignment and arrangement in a casing 13 of three opposed pairs of hydraulic pads 14—14', 15—15' and 16—16'. As shown in FIG. 1, the oppositely arranged pads 14—14' define the horizontal axis Y—Y' of the apparatus. Also, as indicated in FIGS. 1 and 2, the respective pads 16—16' and 15—15' define the vertical axis Z—Z' and horizontal axis X—X' of the apparatus. The respective pads in opposed pairs are located in orthogonal relation in the casing 13 to provide the three axes of the apparatus. Hydraulic fluid 11 common to the axes of the apparatus fills the chamber provided by the casing 13 that surrounds the mass or sphere 10. The volume of the circulating fluid chamber in casing 13 is made sufficiently large to insure that no measurable inter-axis coercion results in the apparatus.

As shown in FIG. 1, the pads 14—14' for axis Y—Y' are connected hydraulically to a circulating pump 17 by means of suitable conduit means, channels or pipes 18 and 19. Identical differential fluid flow channels, conduit means, or pipes 20, 21 connect pump 22 to the pads 16—16' for the axis Z—Z'. A pump 23 likewise functions to circulate fluid to the X—X' axis pads 15—15' by way of the connecting channels, conduit means or pipes 24, 25. The pumps provided in the apparatus as shown in FIG. 2 are of a double ended type and the pipes to the pads are connected to their respective ends. The component parts of each of the three closed fluid flow lines to the common chamber provided in the casing 13 are identical for each of the three axes. The particular flow line and control structure shown in FIG. 2 for axis X—X' is accordingly illustrative of the lines and controls provided for the other axes which are not shown in detail in the drawing to avoid duplication.

As shown in FIG. 2, the pump 23 for the fluid line for axis X—X' includes a rotating member in the form of a screw 26 for circulating the fluid in the apparatus. The ends of the pipes 24 and 25 connected to the closed housing 27 of pump 23 are at the respective ends of the screw member 26 whose shaft 28 is reversibly mounted on the housing 27. In one direction of rotation, the screw member 26 operates to circulate the fluid from the casing chamber through the axial opening in pad 15', through pipe 25 and the pump 23 to pipe 24, and from the pipe 24 through the axial opening in pad 15 back to the casing chamber. This operation occurs when the mass 10 is displaced from its normal condition with relation to the axis X—X' where the geometrical center of the mass is at the intersection point 12, and accordingly the width the fluid gap between the mass and the inside surface of the pad 15 is smaller than the fluid gap between the inside surface of the pad 15' and the mass. When the displacement of mass 10 along axis X—X' is in the reverse direction, the pump member 26 rotates in the reverse direction to circulate the fluid from pad 15 through the pipe 24 and pump housing through pipe 25 and the axial opening in pad 15' to the fluid chamber. This direction of circulation of the fluid in the X—X' axis line requires that the ball or sphere 10 be closer to the surface of pad 15' than it is to the surface of the opposite pad 15. The described circulation of the fluid in the apparatus is dependent in degree on the rate of rotation of the pump screw or member 26 which provides the necessary hydraulic force required to restore the supported mass 10 to its normal condition with relation to the casing of the apparatus.

Scale factor compensations are provided for the improved accelerometer for variations in the temperature of the circulating fluid and for variations in the gap dimensions between the mass and inside surfaces of the centering pads of the apparatus.

Considering the provided temperature compensation where the fluids and masses are of the character heretofore specified with the fluids of greater density than the masses, the scale factor or measure of revolutions per minute displacement of the pump shaft for each unit of acceleration sensed by the apparatus varies with both the buoyancy of the mass and the viscosity of the fluid which both change with temperature. With a net buoyancy of the mass of $m$ grams and an acceleration of $a$ centimeters per second per second on the mass along one of its axes, the displacement force on the mass is represented as $ma$ dynes. The corresponding hydraulic restoring force is a constant $k$ that depends on the hydraulic dimensions of the apparatus multiplied by the pump shaft rate N in revolutions per minute and the absolute viscosity of the fluid $u$. For equilibrium the forces are in balance and $ma=KNu$. The scale factor of the apparatus as represented by the ratio $N/a$ is accordingly directly proportional to $m$ and is inversely proportional to $u$.

To avoid scale factor errors due to variations in temperature, the temperature of the fluid utilized in the apparatus is suitably maintained at a fixed level as determined in the manner indicated by the viscosity and temperature curves of a selected fluid as indicated in FIG. 3. As shown in FIG. 3, the buoyancy of the fluid decreases linearly with increasing temperature to become zero at a temperature $T_0$. To determine the fixed temperature $T_c$ of the fluid in the apparatus, a straight line is drawn through the point of zero buoyancy as indicated on the temperature curve that is tangent to viscosity curve at point $c$. This establishes the temperature $T_c$ of the apparatus at a level where the percent change of viscosity per degree is equal to the percent change of buoyancy. The scale factor ratio accordingly does not vary appreciably with deviation of the fluid temperature from the compensation temperature $T_c$ as clearly shown by the curve in FIG. 4.

The scale factor of the apparatus is initially dependent on the uniformity of the fluid gap widths between the mass or sphere 10 and the respective inside surfaces of the respective pads which cannot feasibly be held to extremely close tolerances. To minimize this source of error, each of the fluid lines of the apparatus circulates approximately only two percent of the output fluid delivered by the pumps through the pads and fluid chambers. Each of the fluid lines of the apparatus accordingly includes means for bypassing the circulating fluid between the ends of the pumps. That is, the hydraulic impedance across respective paired pads of the apparatus is extremely high, so that variations resulting from gap thickness uncertainties have only a second order effect on the restoring force corresponding to a specific pump speed. The bypasses provided permit approximately ninety-eight percent of the fluid output of the pumps to circulate through channels external to the pads. As shown in FIGS. 1 and 2, such bypasses are represented in the form of conduit means, channels or pipes between the respective differential pipes for each of the fluid lines. The combined differential fluid lines to the pads and the connecting bypass line therebetween constitute a means for apportioning the fluid circulation of the pumps in the apparatus that provides an effective minimum fluid flow through the gaps between the respective pads and mass. In the Y—Y' axis flow line, a bypass pipe 29 connects the pipes 18 and 19. A similar pipe 30 connects the pipes 20 and 21 for the Z—Z' axis flow line. The bypass pipe 31 likewise connects the fluid line pipes 24 and 25 for the X—X' axis of the apparatus. As particularly shown in FIG. 2, the flow through the respective bypass pipes is regulated by means of a settable valve 32. The valves for the respective bypass pipes 29 and 30 are respectively indicated at 33 and 34 in FIG. 1.

The remaining scale factor error when only two percent of the flow passes through the fluid gaps is further reduced by providing circular channels in the surfaces of the pads with one or more bleed ports for the fluid that connect the channels to the fluid chamber in bypassing relation to the gaps. The channels are concentrically arranged in the pads with relation to the respective axes of the apparatus. As shown in FIG. 2, for axis X—X', the hydraulic support pad 15 supplies fluid to the chamber along the axis through an axial aperture 35 and passageway 36 that is connected to pipe 24 by a suitable hydraulic coupling. The concave surface of the pad 15 conforms in curvature to the sphere 10 and includes a circular channel 37 therein that is concentric to axis X—X'. Bleed ports 38 and 39 are also provided in the pad 15 that connect the channel 37 to the fluid chamber in bypassing relation to the gap area of the pad between the channel and the fluid chamber. Considering only the inlet flow of fluid through the gap at pad 15, when the gap width decreases by movement of mass 10 along axis X—X' toward the pad, the result will be a lessening of the flow to the chamber accompanied by a slight increase in pressure $P_1$ in the support area $A_1$ of the aperture 35 due to the small increase in total flow resistance observed by the pump. The force along axis X—X' tending to restore the sphere 10 to its central condition rises due to this increase in pressure $P_1$ over the support area $A_1$. However, because of the reduced flow through the inlet gap, the pressure $P_2$ in the support area $A_2$ of the channel 37 will lessen where the resistance to fluid flow through the bleeds 38, 39 is smaller than the flow resistance in the portion of the gap between the channel 37 and periphery of the curved surface of the pad. The force exerted on the mass 10 at the support area $A_2$ of the pad will accordingly diminish as the product $P_2A_2$ becomes smaller. By proper proportioning of the gap, pressure areas $A_1$, $A_2$ and the bleeds, the net hydraulic force exerted against the mass by the fluid circulating through the pads remains substantially constant. With fluid circulating from the inlet gap at pad 15 to the outlet gap at pad 15', the force exerted along the axis X—X' restores the mass to its normal centered position with relation to the axis in which the gap widths between the opposed pads and the mass are equal. The curve in FIG. 5 shows the percent change in the scale factor of the improved accelerometer as the flow resistance at the inlet gap changes percentagewise from its normal resistance due to the axial displacement of the mass as a result of the influence of acceleration thereon. The curve shows that the resistance to flow in this portion of the fluid line can change appreciably in the compensated apparatus without adversely affecting the scale factor.

The operation at the outlet gap of the flow line for axis X—X' at pad 15' is the reverse of that heretofore described for pad 15. In this line, fluid flows toward the pump 23 by way of pipe 25 and the net fluid pressure exerted axially to support the mass 10 diminishes. The structure of the pad 15' is identical to that of pad 15 with the respective axial aperture, passageway, circular channel, and bleed ports being respectively indicated at 40, 41, 42, 43 and 44. The passageway 41 in the pad 15' in this instance is connected to the end of pipe 25 by a suitable hydraulic coupling. In the flow lines for axis Z—Z' and axis Y—Y', the structures of the pads 16, 16' and pads 14, 14' on the casing 13 are identical to the described pads 15, 15'.

The operations of the respective pumps 17, 22 and 23 of the apparatus are dependent on the respective displacements of the mass 10 from a centered condition along the corresponding Y—Y' axis, Z—Z' axis and X—X' axis. The apparatus accordingly includes three identical electrical pick-offs or means for detecting such displacements of the mass 10. As shown in FIG. 2 for the axis X—X' such output means includes a pick-off having two electrically conductive tubular parts 45, 46 that are formed as a portion of the respective pads 15 and 15'. Pick-off part 45 is insulated from the pad 15 by the concentric sleeves 47 and 48. Identical sleeves 49 and 50 insulate the conductive part 46 of the pick-off from pad 15'. The two tubular parts 45 and 46 of the pick-off are located in the casing chamber in concentric relation to the axis X—X' with opposed ends thereof equidistantly spaced in the dielectric fluid in relation to the conductive mass or sphere 10 when it is located in its centered position. The tubes 45 and 46 provide conductive probes in an electrical circuit whose output depends in phase and magnitude upon the direction of movement of the mass with the resultant increase in the dielectric fluid gap at one of the probes and the decrease in the dielectric fluid gap at the other of the probes. In the circuitry shown in FIG. 2 in this connection, transformer 51 has its primary winding excited by a suitable source of alternating electrical energy 52. The secondary winding of the transformer 51 has a center tap connection to ground. A lead 53 connects one end of secondary to pad 15' and a lead 54 connects the other end of the secondary to the pad 15, both connections being at a portion of the respective pads that are insulated from the probes or tubes 45, 46. Probe 45 of the arrangement is connected to amplifier 55 by way of lead 56 and probe 46 is connected to the amplifier 55 by way of lead 57 and lead 56. The phase and magnitude of the output of the amplifier 55 are directly dependent on the direction and amount of the displacement of the mass 10 along axis X—X' toward one or the other pads 15, 15'.

The apparatus further includes means for operating the respective pumps 17, 22 and 23 in accordance with outputs of the corresponding means provided for sensing the displacements of the mass along the axis Y—Y', axis Z—Z' and axis X—X'. For axis X—X' such means is shown in FIG. 2 to include an electric motor 58 that is driven by the output of the amplifier 55 by way of lead 59. The motor 58 is connected to drive the shaft 28 of pump 23 through suitable reduction gearing 60 and a magnetic coupling 61. As shown, coupling 61 consists of two rings 62, 63 that are arranged in concentric relation to the axis of the pump shaft 28. Each of the rings of the coupling includes a plurality of magnets located in spoke relation to the axis. Ring 62 of the arrangement is located on the driven gear of the reduction gearing 60 which is mounted to move about a stub shaft 64 extending from the closed housing of pump 23. The ring 63 within the housing 27 is mounted on an extension of the shaft 28. Coupling 61 eliminates rotating seal problems in each of the respective closed fluid lines of the apparatus. The respective pump housings, the casing 13 and the connecting pipes for all three axes between the respective pumps and casing are respectively arranged as an assembly of hydraulic parts from which there is no fluid leakage being fixedly connected to a suitably common frame or enclosure as indicated at 65 in FIG. 1 to which the pump drive means or motors may also be connected.

As shown in FIG. 1, the motor and magnetic coupling for driving the Z—Z' axis pump 22 are respectively indicated at 66 and 67. Corresponding parts for the Y—Y' axis pump 17 are motor 68 and magnetic coupling 69.

The improved accelerometer provides an integrated measure of the acceleration sensed by the mass along the respective axes X—X', Y—Y', and Z—Z'. As shown in FIG. 2, this output measure for the X—X' axis is dependent on the rotation of the driven member 26 of the pump 23 and is obtained from a suitable revolution counter 70 that is driven by the output shaft of motor 58 through a gear connected to the reduction gearing 60 to the coupling 61. The counters for the Y—Y' axis and Z—Z' axis of the apparatus are respectively indicated at 71 and 72, in FIG. 1. The mass, sphere or ball 10 of the apparatus is supported in the casing by the circulation of fluid through the pads in a condition with normally equal gap widths between the pads and the geometrical center of the mass at the intersection of the axis. The mass senses acceleration along the respective axes by its displacement towards and away from the respective surfaces of pairs of the pads to obtain the necessary output to operate the respective pumps of the apparatus. The pumps operate to circulate the fluid through the required pads to and away from the fluid filled casing to restore the mass, sphere or ball to its normal condition. As the motors operate to drive the pumps, the respective counters provide an integrated measure of the acceleration sensed by the mass, ball or sphere along the respective orthogonal axes X—X', Y—Y' and Z—Z'.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Hydraulic apparatus providing an integrated measure of acceleration along three orthogonally arranged axes including a dielectric fluid, a casing with a fluid filled chamber having three opposed pairs of hydraulic pads located in orthogonal relation therein to provide the axes of the apparatus, an acceleration sensing mass of a density different than the density of the fluid located in the chamber between the pads with normally equal gap widths between the mass and pads and the geometrical center of the mass at the intersection of the axes, means for providing outputs depending on the displacement of the mass along the orthogonal axes from a centered condition, a double ended fluid pump for each of the axes having a rotatable member for circulating the fluid in the apparatus, conduit means connecting the opposed pads for each axis to the respective ends of one of the pumps including means for bypassing the circulating fluid between the ends of the pump, means for rotating said pump members responsive to the respective outputs of said output means to circulate the fluid through the pads and thereby restore the mass to its normal condition, and means dependent on the rotation of said pump rotating means providing an integrated measure of the acceleration sensed by the mass along the respective axes.

2. Apparatus as claimed in claim 1, in which said mass is a sphere having electrical conductivity, and the output of said displacement output means is electrical.

3. Apparatus as claimed in claim 1, in which said mass is a sphere, and where each of said pads have a concave surface conforming to the curvature of the sphere that includes a circular channel therein concentric to an axis, and a bleed port for the fluid connecting the channel to the fluid chamber in bypassing relation to the gap.

4. Apparatus as claimed in claim 1, in which said mass is a sphere having electrical conductivity, and said output means includes an electrical pick-off for each of the axes of the apparatus having two tubular parts located in the casing chamber concentric to an axis with opposed ends equidistantly spaced in the dielectric fluid in relation to the centered sphere.

5. Apparatus as claimed in claim 1, in which the pumps include closed housings, the pump rotating means is coupled magnetically to the rotatable pump members, and the apparatus includes an assembly of the respective pump housings, the casing and the connecting conduit means between the casing and the respective pump housings.

6. Hydraulic apparatus providing an integrated measure of acceleration along three orthogonally arranged axes including a dielectric fluid, a casing with a fluid filled chamber having three opposed pairs of hydraulic pads located in orthogonal relation therein to provide the axes of the apparatus, a spherical mass of a density different than the density of the fluid located in the chamber between the pads with normally equal gap widths between the mass and pads, means providing outputs depending on the displacement of the mass along the axes from a normal gap condition due to the influence of acceleration thereon, a fluid pump for each of the axes having a rotatable member for circulating the fluid in the apparatus, differential fluid channels connecting the opposed pads for each axis to one of the pumps, a fluid bypass between the differential channels for each of the opposed pairs of pads, means for rotating said pump members to circulate the fluid through the pads and thereby restore the mass to its normal gap condition in accordance with the outputs of said displacement output means, and means providing an integrated measure of the influence of acceleration on the mass operable in accordance with the rotation of said pump members.

7. Apparatus as claimed in claim 6, in which each of said pads have a concave surface conforming to the curvature of the spherical mass that includes a circular channel therein concentric to an axis, and a bleed port for the fluid connecting the circular channel to the fluid chamber in bypassing relation to the gap.

8. Apparatus as claimed in claim 6, in which said spherical mass is an electrical conductor, and said output means is an electrical pick-off for each of the axes of the apparatus having two ring parts located in the casing chamber concentric to an axis with opposed circular ends equidistantly spaced in the dielectric fluid in relation to the centered spherical mass.

9. Apparatus as claimed in claim 6, in which the pumps include closed housings, the pump rotating means is coupled magnetically to the rotatable pump members, and the apparatus includes an assembly of the respective pump housings, the casing and the differential fluid flow channels.

10. In a three axis accelerometer, hydraulic apparatus including a fluid, a casing with a fluid filled chamber having three opposed pairs of hydraulic centering pads located in orthogonal relation therein to provide the axes of the accelerometer, an acceleration sensing mass of a density different than that of the fluid located in the chamber between the pads with normally equal gap widths between the mass and pads and with the geometrical center of the mass at the intersection of the axes, a pump for each of the axes having a member operating to circulate the fluid in the apparatus; means for apportioning the fluid circulation of the pumps in the apparatus to provide an effective minimum fluid flow through the gaps between the respective pads and mass including differential fluid lines connecting the opposed pads for each axis to one of the pumps, and a bypass fluid line connecting the differential fluid lines for each of the opposed pairs of pads; means providing outputs depending on the displacement of the mass along the axes from a normal gap condition due to the influence of acceleration thereon, and means for operating said pump members in accordance with the outputs of the displacement output means to restore the mass to its normal gap condition.

11. An accelerometer of the character claimed in claim 10, in which the mass of the hydraulic apparatus is an electrically conductive sphere of solid beryllium, the fluid of the hydraulic apparatus is a dielectric liquid polybromotrifluoroethylene compound, and the displacement output means and pump member operating means are electrical.

12. An accelerometer of the character claimed in claim 10, in which the mass of the hydraulic apparatus is an electrically conductive ball of hollow aluminum, the fluid of the hydraulic apparatus is a dielectric silicon oil, and the displacement output means and pump member operating means are electrical.

13. An accelerometer of the character claimed in claim 10, in which the centering pads of the hydraulic apparatus have a total surface area conforming to the mass that includes an axially concentric, circular channel therein, and a port for the circulating fluid bypassing the pad gap area between the channel and the fluid chamber, the relative dimensions of the total pad surface area, the channel, channel gap pad area, and port being such that the net hydraulic force exerted against the mass by the fluid circulating through the gaps remains substantially constant.

14. In an accelerometer, hydraulic apparatus including a fluid, a casing with a fluid filled chamber having an opposed pair of hydraulic centering pads located in axially spaced relation therein to provide the axis of the accelerometer, an acceleration sensing mass of a density different than that of the fluid located in the chamber between the pads with normally equal gap width between the mass and pads, a pump having a member operating to circulate the fluid in the apparatus; means for apportioning the fluid circulation of the pump in the apparatus to provide an effective minimum fluid flow through the gaps between the pads and mass including differential fluid lines connecting the opposed pads to the pump, and a bypass fluid line connecting the differential fluid lines;

means providing an output depending on the displacement of the mass along the axis from a normal gap condition due to the influence of acceleration thereon, and means for operating the pump member in accordance with the output of the displacement output means to restore the mass to its normal gap condition.

15. An accelerometer of the character claimed in claim 14, in which the mass of the hydraulic apparatus is an electrically conductive sphere, the fluid of the hydraulic apparatus is a dielectric liquid, and the displacement output means and pump member operating means are electrical.

16. An accelerometer of the character claimed in claim 14, in which the mass of the hydraulic apparatus is a sphere, and the centering pads of the hydraulic apparatus have a total concave surface area conforming to the sphere that includes an axially concentric, circular channel thereon, and a port for the circulating fluid bypassing the pad gap area between the channel and the fluid chamber, the relative dimensions of the total pad surface area, the channel, channel gap pad area, and port being such that the net hydraulic force exerted against the mass by the fluid circulating through the gaps remains substantially constant.

References Cited in the file of this patent
UNITED STATES PATENTS

| | | |
|---|---|---|
| 2,692,803 | Gerard | Oct. 26, 1954 |
| 2,908,164 | Bamber | Oct. 13, 1959 |
| 2,919,583 | Parker | Jan. 5, 1960 |
| 2,940,318 | Adams et al. | June 14, 1960 |
| 2,968,954 | Mueller | Jan. 24, 1961 |